(12) United States Patent
Vaughn et al.

(10) Patent No.: US 10,157,630 B2
(45) Date of Patent: Dec. 18, 2018

(54) RECORD STABILIZER FOR MULTIPLE VINYL SIZES

(71) Applicant: Breakaway Records, L.L.C., Austin, TX (US)

(72) Inventors: Gabriel Lee Vaughn, Austin, TX (US); Joshua Peyton Payne LaRue, Austin, TX (US)

(73) Assignee: Breakaway Records, L.L.C., Austin, TX (US)

( * ) Notice: Subject to any disclaimer, the term of this patent is extended or adjusted under 35 U.S.C. 154(b) by 0 days.

(21) Appl. No.: 15/827,563

(22) Filed: Nov. 30, 2017

(65) Prior Publication Data
US 2018/0158471 A1    Jun. 7, 2018

Related U.S. Application Data

(60) Provisional application No. 62/429,291, filed on Dec. 2, 2016.

(51) Int. Cl.
*G11B 3/61* (2006.01)

(52) U.S. Cl.
CPC .................... *G11B 3/61* (2013.01)

(58) Field of Classification Search
None
See application file for complete search history.

(56) References Cited

U.S. PATENT DOCUMENTS

| | | | | |
|---|---|---|---|---|
| 1,881,110 A | * | 10/1932 | Ramsey | G11B 3/70 369/282 |
| 2,146,519 A | * | 2/1939 | Zimmerman | G11B 17/00 360/133 |
| 3,588,123 A | * | 6/1971 | Candella | G11B 3/5827 369/72 |
| 4,260,161 A | * | 4/1981 | Frank | G11B 23/42 369/270.1 |

(Continued)

FOREIGN PATENT DOCUMENTS

| | | | | |
|---|---|---|---|---|
| GB | 2032676 A | * | 5/1980 | ......... G11B 19/2009 |
| HU | 65479 T | * | 6/1994 | |
| JP | 2014142983 A | * | 8/2014 | |

OTHER PUBLICATIONS

RIAA, Inc., Bulletin(s) "Standards for Stereophonic Disc Records," pp. 1-5 (and drawing sheet), Oct. 16, 1963 (Year: 1963).*

(Continued)

*Primary Examiner* — William J Klimowicz
(74) *Attorney, Agent, or Firm* — Meyertons, Hood, Kivlin, Kowert & Goetzel, P.C.

(57) ABSTRACT

In some embodiments, a record stabilizer is configured to fit both common size spindle holes (e.g., as commonly found in 12" singles or LPs) and larger hole types (e.g., as commonly found in 7" 45 rpm singles, typically referred to as "45s"). In some embodiments, the stabilizer achieves this functionality using one side that is substantially flat (for common size spindle holes) and another side with a built-in adapter to protrude into larger spindle holes. In some embodiments, (Continued)

the record stabilizer also serves as an adapter, e.g., allowing 45s to be played on turntables with common size spindles without using any other adapter.

6 Claims, 1 Drawing Sheet

(56) References Cited

U.S. PATENT DOCUMENTS

2015/0008603 A1\* 1/2015 Martindale ............. B29C 73/30
264/36.13

OTHER PUBLICATIONS

Fred Crowder, "Pierre Lurne Record Clamp Review," https://www.dagogo.com/pierre-lurne-record-clamp-review/, Jun. 2010, 4 pages.
Record Clamps—Do They Make a Difference?—Blog, http://hub.audiogon.com/blog/2013/11/05/record-clamps-difference/, 6 pages. [Retrieved Nov. 17, 2017].

\* cited by examiner

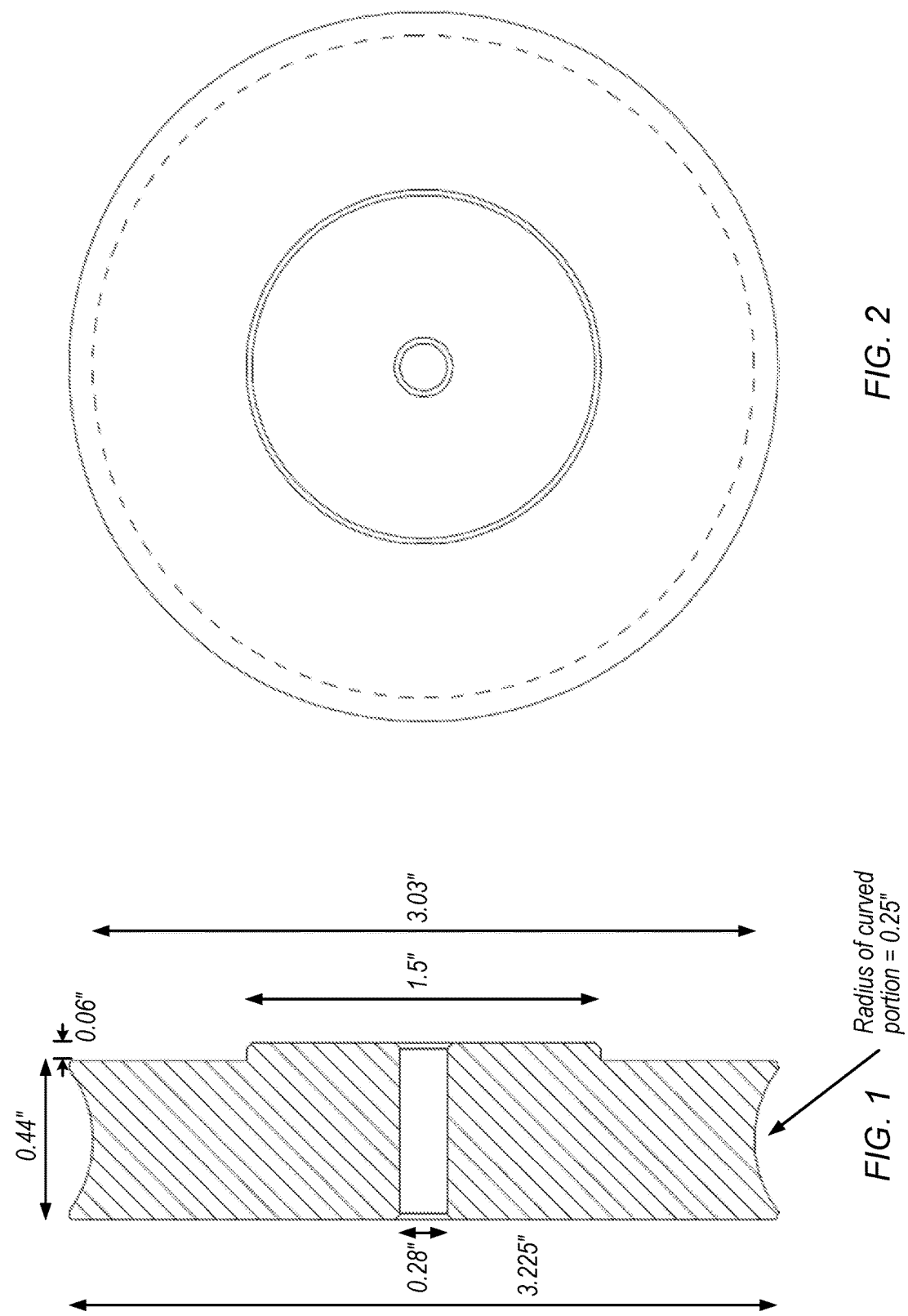

RECORD STABILIZER FOR MULTIPLE VINYL SIZES

This application claims the benefit of U.S. Provisional Application No. 62/429,291, filed on Dec. 2, 2016, which is incorporated by reference herein in its entirety.

BACKGROUND

Technical Field

This disclosure relates to audio record players and more specifically to stabilizers for vinyl records.

Description of the Related Art

Disc stabilizer weights have been used to improve vinyl sound quality, e.g., by sound damping and leveling vinyl surface (e.g., if a record has become warped). Traditional stabilizers, however, are often bulky and are not compatible with different types of records. Further, different stabilizers are traditionally needed for different types of records.

BRIEF DESCRIPTION OF THE DRAWINGS

FIG. 1 is a diagram illustrating a side view of a record stabilizer, according to some embodiments.

FIG. 2 is a diagram illustrating a top view of a record stabilizer, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

DETAILED DESCRIPTION

In some embodiments, a record stabilizer is configured to fit both common size spindle holes (e.g., as commonly found in 12" singles or LPs) and larger hole types (e.g., as commonly found in 7" 45 rpm singles, typically referred to as "45s"). In some embodiments, the stabilizer achieves this functionality using one side that is substantially flat (for common size spindle holes) and another side with a built-in adapter to protrude into larger spindle holes. In some embodiments, the record stabilizer also serves as an adapter, e.g., allowing 45s to be played on turntables with common size spindles without using any other adapter. This may reduce the amount of equipment needed when using multiple sizes of records. In some embodiments, the record stabilizer is smaller and more portable than traditional designs.

In some embodiments, the record stabilizer is constructed of stainless steel. In other embodiments, other materials may be used, alone or in combination with stainless steel. Examples of other materials include wood, other types of steel, other metals, etc. Stainless steel embodiments in particular, however, formed according to the dimensions discussed below, may provide better stabilization and warp flattening than traditional designs in a relatively smaller form factor. In some embodiments, the stabilizer weighs between 14 and 18 ounces.

In some embodiments, the record stabilizer helps flatten warps in records, which may allow less than ideals copies of 45s and 12"s to be played, back-cued and handled with ease. In some embodiments, the record stabilizer's stabilization of the record helps to minimize or alleviate vibrations and feedback. In some embodiments, the record stabilizer increases clarity and accuracy in sound reproduction. The record stabilizer may also serve as a disc cover up to keep cuts a secret and may fit under many turntable dustcovers because of its low profile.

In some embodiments, the stabilizer is 3.25 inches in diameter and has a height (e.g., in the vertical direction when placed on a horizontal record) of 0.5 inches. These dimensions are included for purposes of explanation of some embodiments, but are not intended to limit the scope of the present disclosure. In other embodiments, similar stabilizer techniques may be sized differently (e.g., including different adapter portion sizes) for different types of records that are currently known or to be designed in the future.

FIG. 1 illustrates a side view of a stabilizer, according to some embodiments. In the illustrated embodiment, the adapter portion protrudes 0.06 inches from the primary cylinder and has a diameter of 1.5 inches. In the illustrated embodiment, the primary cylinder has a circular cut-out portion around its edge with a radius of 0.25 inches (although the primary cylinder may not include such a cut-out portion in other embodiments, the cut-out may facilitate handling of the stabilizer by users and/or provide an ideal overall weight for the stabilizer). In the illustrated embodiment, the primary cylinder has a height of 0.44 inches, an overall diameter of 3.225 inches, and a diameter between the cut-out portions of 3.03 inches. In the illustrated embodiment, the spindle hole in the primary cylinder has a diameter of 0.28 inches.

In various embodiments configured to stabilize both 45s and LPs, these dimensions may vary slightly. As one example, a size of the spindle hole is between 0.27 and 0.29 inches, a diameter of the adapter cylindrical portion is between 1.45 and 1.55 inches, a width of the primary cylindrical portion is between 0.4 and 0.6 inches, and a diameter of the primary cylindrical portion is between 3 and 4 inches. As another example, a size of the spindle hole is between 0.24 and 0.30 inches, a diameter of the adapter cylindrical portion is between 1.45 and 1.55 inches, a width of the primary cylindrical portion is between 0.25 and 2 inches, and a diameter of the primary cylindrical portion is between 2 and 7 inches.

FIG. 2 illustrates a top view of a stabilizer, according to some embodiments. The illustrated view is from the side with the adapter. The adapter may be installed facing up for records with smaller spindle holes and facing down (and with the adapter portion within the spindle hole) for records with larger spindle holes, allowing those records to be played on smaller spindles without requiring another adapter.

The dimension shown in FIGS. 1 and 2 are shown for purposes of explanation of some embodiments but are not intended to limit the scope of the present disclosure. For example, in other embodiments, different adapter sizes may be used for discs with different spindle hole sizes, different thicknesses and diameters of the primary cylinder may be used, etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A record stabilizer apparatus, comprising:
   a primary cylindrical portion configured to stabilize a record while the record is played, when placed on the record on a turntable, wherein the primary cylindrical portion includes a spindle hole through the center of the primary cylindrical portion having a diameter that is sized to slide over turntable spindles of a first size;
   an adapter cylindrical portion proximate the primary cylindrical portion and configured to protrude into a spindle hole of records that have a spindle hole for a second, larger spindle size;
   wherein a width of the primary cylindrical portion is between 0.4 and 0.6 inches and a diameter of the primary cylindrical portion is between 3 and 4 inches;
   wherein the primary and adapter cylindrical portions are stainless steel and wherein the apparatus weighs between 14 and 17 ounces;
   wherein a size of the spindle hole is between 0.24 and 0.30 inches and a diameter of the adapter cylindrical portion is between 1.45 and 1.55 inches; wherein the apparatus is configured to stabilize records having a spindle hole for spindles of the first size when placed on a record with a first side of the primary cylindrical portion proximate the record and configured to stabilize records having a spindle hole for spindles of the second size when placed on a record with a second side of the primary cylindrical portion proximate the record, wherein the second side includes the adapter cylindrical portion.

2. The record stabilizer apparatus of claim 1, wherein a diameter of the primary cylindrical portion is 3.25 inches, a diameter of the adapter cylindrical portion is 1.5 inches.

3. The record stabilizer apparatus of claim 2, wherein a width of the primary cylindrical portion is 0.5 inches.

4. The record stabilizer apparatus of claim 1, wherein the primary cylindrical portion includes a circular cut-out portion around its outer edge.

5. The record stabilizer apparatus of claim 1, wherein the apparatus is configured to flatten warps and reduce vibrations of the record while it is being played.

6. An apparatus, comprising:
   a primary cylindrical portion configured to stabilize a record while the record is being played, when placed on the record on a turntable, wherein the primary cylindrical portion includes a spindle hole through the center of the primary cylindrical portion having a diameter that is sized to slide over turntable spindles of a first size; and
   an adapter cylindrical portion proximate the primary cylindrical portion and configured to protrude into a spindle hole of records that have a spindle hole for a second, larger spindle size;
   wherein the apparatus is configured to stabilize records having a spindle hole for spindles of the first size when placed on a record with a first side of the primary cylindrical portion proximate the record and configured to stabilize records having a spindle hole for spindles of the second size when placed on a record with a second side of the primary cylindrical portion proximate the record, wherein the second side includes the adapter cylindrical portion; and
   wherein a size of the spindle hole is between 0.24 and 0.30 inches, a diameter of the adapter cylindrical portion is between 1.45 and 1.55 inches, a width of the primary cylindrical portion is between 0.4 and 0.6 inches, a diameter of the primary cylindrical portion is between three and seven inches, wherein the primary and adapter cylindrical portions are stainless steel, and the apparatus weighs between 14 and 17 ounces.

* * * * *